US012566955B2

(12) United States Patent
Utasi

(10) Patent No.: US 12,566,955 B2
(45) Date of Patent: Mar. 3, 2026

(54) METHOD FOR TRAINING A NEURAL NETWORK

(71) Applicant: Continental Autonomous Mobility Germany GmbH, Ingolstadt (DE)

(72) Inventor: Akos Utasi, Göd (HU)

(73) Assignee: CONTINENTAL AUTONOMOUS MOBILITY GERMANY GMBH, Ingolstadt (DE)

(*) Notice: Subject to any disclaimer, the term of this patent is extended or adjusted under 35 U.S.C. 154(b) by 773 days.

(21) Appl. No.: 17/815,025

(22) Filed: Jul. 26, 2022

(65) Prior Publication Data

US 2023/0035615 A1 Feb. 2, 2023

(30) Foreign Application Priority Data

Jul. 27, 2021 (EP) .................................... 21187954

(51) Int. Cl.
*G06N 3/08* (2023.01)
*G06N 3/048* (2023.01)

(52) U.S. Cl.
CPC ............... *G06N 3/08* (2013.01); *G06N 3/048* (2023.01)

(58) Field of Classification Search
CPC ................................. G06N 3/08; G06N 3/048
USPC .......................................................... 706/25
See application file for complete search history.

(56) References Cited

U.S. PATENT DOCUMENTS 11,651,230 B2 5/2023 Li
2018/0225564 A1* 8/2018 Haiut ....................... G06N 3/08

2019/0114531 A1 4/2019 Torkamani et al.
2019/0139622 A1 5/2019 Osthege
2020/0343985 A1 10/2020 O'shea et al.
(Continued)

FOREIGN PATENT DOCUMENTS

BR 112019027609 B1 * 1/2025
CN 107122825 A 9/2017
(Continued)

OTHER PUBLICATIONS

Oostwal et al. Phase Transitions in Layered Neural Networks: The Role of The Activation Function, Dec. 2020, University of Groningen (Year: 2020).*

(Continued)

*Primary Examiner* — Usmaan Saeed
(74) *Attorney, Agent, or Firm* — Buchanan Ingersoll & Rooney P.C.

(57) ABSTRACT

The present disclosure relates to a method for training an artificial neural network, the method including providing a neural network to be trained, wherein after training the neural network is to be operated based on a first activation function. An initial training of the neural network is executed based on the at least a second activation function, the at least one second activation function being different to the first activation function. In a transition phase, further training steps are executed using a combination of the first activation function and the at least one second activation function. The combination of training functions is changed over time such that an overweighting of the second activation function at the beginning of the transition phase changes towards an overweighting of first activation function at the end of the transition phase. A final training step is based on the first activation function.

13 Claims, 3 Drawing Sheets

(56) References Cited

U.S. PATENT DOCUMENTS

| | | | |
|---|---|---|---|
| 2021/0142171 | A1 | 5/2021 | Jung et al. |
| 2021/0232091 | A1* | 7/2021 | Hong .................. G03H 1/0866 |
| 2021/0248473 | A1* | 8/2021 | Shazeer ................ G06N 3/084 |
| 2021/0370993 | A1* | 12/2021 | Qian ..................... B61L 23/042 |
| 2022/0138562 | A1 | 5/2022 | Biryukova |
| 2023/0035069 | A1 | 2/2023 | Utasi |
| 2023/0394304 | A1 | 12/2023 | Zhu et al. |

FOREIGN PATENT DOCUMENTS

| | | |
|---|---|---|
| CN | 107516128 A | 12/2017 |
| CN | 108388941 A | 8/2018 |
| CN | 112906866 A | 6/2021 |

OTHER PUBLICATIONS

Manessi et al., Learning Combinations of Activation Functions, Apr. 25, 2019, Published as a conference paper at ICPR. (Year: 2019).*

Jie Renlong et al: "Regularized Flexible Activation Function Combination for Deep Neural Networks", 2020 25th International Conference on Pattern Recognition (ICPR), IEEE, Jan. 10, 2021 (Jan. 10, 2021), pp. 2001-2008, XP033908448, DOI: 10.1109/ICPR48806. 2021.9412370.

Brosnan Yuen et al: "Universal Activation Function for Machine Learning", arxiv.org, Cornell University Library, 201 Olin Library Cornell University Ithaca, NY 14853, Nov. 7, 2020 (Nov. 7, 2020), XP081808784.

Zhang Yichi et al, "FracBNN: Accurate and FPGA-Efficient Binary Neural Networks with Fractional Activations", The 2021 ACM/ SIGDA International Symposium on Field-Programmable Gate Arrays, ACMPUB27, New York, NY, USA, Feb. 17, 2021 (Feb. 17, 2021), pp. 171-182, XP058563339.

Nandi et al., Improving the Performance of Neural Networks with an Ensemble of Activation Functions, 2020 International Joint Conference on Neural Networks (IJCNN), Jul. 19-24, 2020, pp. 1-7, DOI: 10.1109/CNN48605.2020.9207277.

Diganta Misra, "A Self Regularized Non-Monotonic Activation Function", the 31st British Machine Vision Virtual Conference, Sep. 7-10, 2020, https://www.bmvc2020-conference.com/assets/papers/ 0928.pdf., arXiv preprint arXiv:1908.08681, 2019.

Jang et al, Neural Networks with Activation Networks, arXiv:1811. 08618 [cs.CV]. 2018.

Shridhar et al., "A Probabilistic Activation Function for Deep Neural Networks", https://arxiv.org/pdf/1905.10761.pdf, Jun. 16, 2020.

Ramachandran et al., "Searching for Activation Functions", arXiv: 1710.05941v2, Oct. 27, 2017, https://arxiv.org/pdf/1710.05941.pdf.

Harmon et al., "Activation Ensembles for Deep Neural Networks", arXiv: 1702.07790v1, https://arxiv.org/pdf/1702.07790.pdf, Feb. 24, 2017.

Eurpoean Search Report for counterpart EPO application EP 21 187 954.9, Feb. 4, 2022.

Hendrycks et al., "Gaussian Error Linear Units (GELUs)", arXiv:1606. 08415v4, Jul. 8, 2020.

Nair et al., "Rectified Linear Units Improve Restricted Boltzmann Machines," ICML '10: Proceedings of the 27 International Conference on International Conference on Machine Learning, Jun. 2010, pp. 807-814.

Clevert et al., "Fast and Accurate Deep Network Learning by Exponential Linear units (ELUs)," 4th Intl Conf on Learning Representations 2016, May 2016, pp. 1-8, arXiv 1511.07289.

Tianhe Yu et al., "Gradient Surgery for Multi-Task Learning," arXiv:2001.067824v4, Dec. 22, 2020.

Chen et al, "Just Pick a Sign: Optimizing Deep Multitask Models with Gradient Sign Dropout," 34th Conf. on Neural Information Processing Systems, 2020.

Garrett Bingham et al: "Discovering Parametric Activation Functions", arxiv.org, Cornell University Library, 201 Olin Library Cornell University Ithaca, NY 14853, Jan. 30, 2021 (Jan. 30, 2021), XP081870742.

Shuanglong Liu et al: "Optimizing Fully Spectral Convolutional Neural Networks on FPGA", 2020 International Conference on Field-Programmable Technology (ICFPT), IEEE, Dec. 9, 2020 (Dec. 9, 2020), pp. 39-47, XP033910218.

Samba Raju Chiluveru et al: "Efficient Hardware Implementation of DNN-Based Speech Enhancement Algorithm With Precise Sigmoid Activation Function", IEEE Transactions on Circuits and Systems II: Express Briefs, IEEE, USA, vol. 68, No. 11, May 25, 2021 (May 25, 2021), pp. 3461-3465, XP011885608.

Dugas et al. "Incorporating Second-Order Functional Knowledge for Better Option Pricing", Proceedings of the 13th International Conference on Neural Information Processing Systems, 2000.

Extended European Search Report issued Feb. 1, 2022, by the European Patent Office in European Patent Application No. 21187958. 0-1203. (8 pages).

Office Action issued by the U.S. Patent and Trademark Office in the U.S. Appl. No. 17/815,075, mailed May 28, 2025, U.S. Patent and Trademark Office, Alexandria, VA. (14 pages).

Gulcehre et al., "Mollifying Networks", arXiv:1608.04980v1 [cs. LG] (Aug. 17, 2016), pp. 1-11.

Office Action (The First Office Action) issued Nov. 4, 2025, by the State Intellectual Property Office of People's Republic of China in corresponding Chinese Patent Application No. 202210863417.5 and an English translation of the Office Action. (26 pages).

Office Action (The First Office Action) issued Nov. 14, 2025, by the State Intellectual Property Office of People's Republic of China in Chinese Patent Application No. 202210859174.8 and an English translation of the Office Action. (17 pages).

* cited by examiner

Initial training phase — Train neural network using second activation function based on a start parameter setup transition training phase — Train neural network using a time-variant combination of first and second activation function final training phase — Train neural network using first activation function

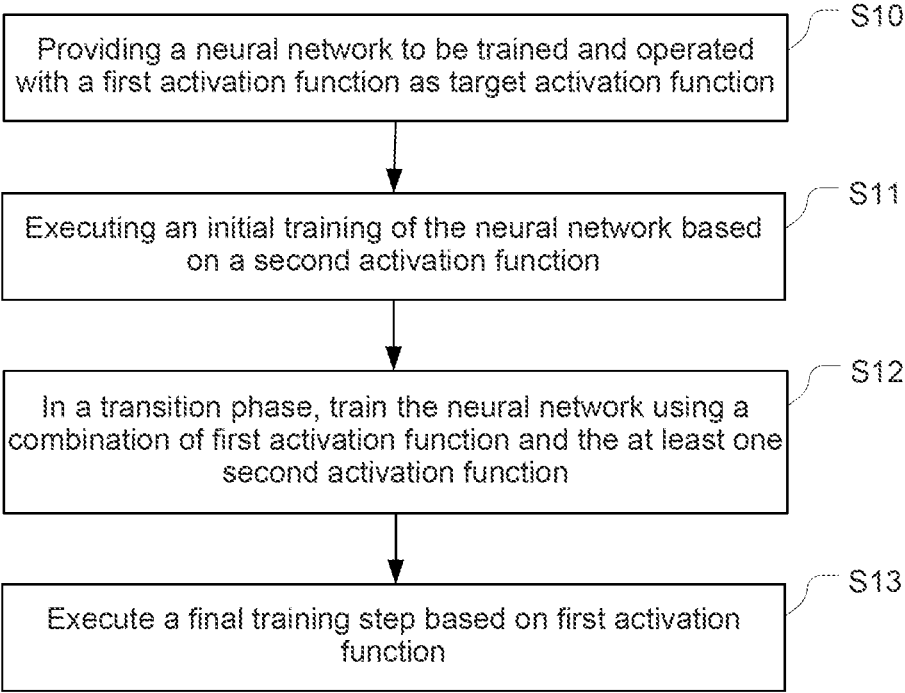

Providing a neural network to be trained and operated with a first activation function as target activation function — S10

Executing an initial training of the neural network based on a second activation function — S11

In a transition phase, train the neural network using a combination of first activation function and the at least one second activation function — S12

Execute a final training step based on first activation function — S13

Fig. 5

METHOD FOR TRAINING A NEURAL NETWORK

CROSS REFERENCE TO RELATED APPLICATION

The present application claims the benefit and/or priority of European application 21187954.9, filed Jul. 27, 2021, the content of which is incorporated by reference herein.

TECHNICAL FIELD

The present invention relates generally to the field of artificial neural networks. More specifically, the invention relates to a method for training a convolutional neural network by using multiple different activation functions.

BACKGROUND

Deep learning and neural networks are currently the state-of-the-art machine learning solutions for various tasks in many different input domains, including visual, audio, time series data. Activation functions are typically used to introduce non-linearity into the neural network.

Currently, the most popular activation is the rectified linear unit (ReLU) activation, which is defined as y=max (0,x), i.e. clipping the negative values of the input to zero. There are other variants of ReLU, for example ReLU6 clips the value at maximum of 6.

Most modern GPU/TPU/CPU chips give hardware support to compute different popular activation functions efficiently. However, in embedded systems the number of supported activations is very limited (typically only ReLU or its variant is supported). On the other hand, these activations usually have inferior performance as compared to networks using state-of-the-art activation functions proposed recently (e.g. GELU, ELU, Swish, Mish etc). Unfortunately, the hardware support for these state-of-the-art activation functions is very limited and is completely missing for embedded chips.

Therefore, neural networks using state-of-the-art activation functions cannot be efficiently executed on most embedded systems since these activation functions are not supported by the hardware, because in most cases, only some ReLU-variants are supported.

SUMMARY

It is an objective of the embodiments of the present disclosure to disclose a method for training a neural network which provides, as a training result, a high-efficient neural network even in case of a target hardware which only provides a hardware support for a limited number of activation functions.

The objective is addressed by the features of the independent claims. Embodiments are given in the dependent claims. If not explicitly indicated otherwise, embodiments of the present disclosure may be freely combined with each other.

According to an aspect, the present disclosure refers to a method for training an artificial neural network. The method includes the following steps.

First, a neural network to be trained is provided. After training, the neural network is operated based on a first activation function. In other words, in a production phase, the neural network uses a first activation function for introducing non-linearity into the neural network. In the production phase, the neural network is operated based on embedded hardware, in the following referred to as target hardware, which provides hardware support for the first activation function.

An initial training of the neural network is executed based on at least one second activation function. The at least one second activation function is different to the first activation function, i.e., the first and second activation functions have different transfer functions.

After performing initial training, further training is performed in a transition phase. In the transition phase, further training steps are executed in which the neural network is trained using a combination of the first activation function and the at least one second activation function. In the further training steps, the combination of training functions is changed over time such that an overweighting of the at least one second activation function at the beginning of the transition phase changes towards an overweighting of the first activation function at the end of the transition phase. In other words, due to a time-variant change of the combination of the first activation function and the at least one second activation function, the influence of the second activation function is gradually reduced in the transition phase and the influence of the first activation function is gradually increased in order to obtain a smooth transition from the second activation function to the first activation function.

Finally, a final training step is executed based on the first activation function.

The proposed training method is advantageous because due to using a state-of-the-art activation function for neural network training at the beginning and changing the overall activation function by a time-variant combination of first and least one second activation functions towards another activation function for which hardware support by the target hardware is available, an improved training result and therefore higher efficiency of the trained neural network may be obtained. It is worth mentioning, that from the target hardware's point of view, this performance improvement comes for free, because only the model training is affected, but the network structure remains unchanged.

The proposed method may be used for training neural networks for image processing tasks in automotive applications. Beside the most common deep learning tasks like object detection, lane detection and semantic segmentation, the proposed method may also be used for training neural networks for other 2D image processing tasks, like mono-camera based depth estimation, surface normal estimation, keypoint detection for, e.g., human pose estimation, etc.

According to an example embodiment, the combination is a linear combination of the first activation function and the at least one second activation function, wherein the linear combination is changeable by means of a tuning factor. By selecting the tuning factor appropriately, the effect of the first activation function and the at least one second activation function on the overall activation function used for training the neural network may be varied.

According to an example embodiment, an overall activation function providing a linear combination of a first activation function and a second activation function is built as follows:

$$f_{act,overall} = \alpha \cdot f_{act,1} + (1-\alpha) \cdot f_{act,2}$$

wherein:
- $\alpha$: tuning factor, wherein $\alpha \in [0,1]$;
- $f_{act,1}$: first activation function; and
- $f_{act,2}$: second activation function.

According to an example embodiment, a scheduler adapts the tuning factor in the transition phase such that the first activation function is overweighted increasingly within the transition phase. Thereby, in the transition phase, the activation function is increasingly tuned towards the first activation function in an automated way in order to obtain a neural network at the end of the training which is adapted to solely use first activation function.

According to an example embodiment, the tuning factor is changed linearly or nonlinearly in the transition phase. Depending on the respective neural network to be trained linear or nonlinear change of tuning factor may result in a better performance of the neural network. Therefore, linear or nonlinear change of the tuning factor may be chosen depending on the neural network and depending on the task to be performed by the neural network.

According to an example embodiment, the combination is a random selection of the first activation function or the at least one second activation function. Also by randomly selecting first and second activation functions, a suitable transition from using solely second activation function in initial training phase and using solely first activation function in final training phase may be obtained.

According to an example embodiment, the probability for randomly selecting the first activation function or the at least one second activation function is changeable by means of a tuning factor. In other words, the random selection is influenced by the tuning factor and based on the tuning factor the frequency ratio of using first or second activation function may be changed. Thus, based on the tuning factor it is possible to perform a random selection of the first activation function or the at least one second activation function such that at the beginning of the transition phase, the second activation function is always or mostly selected and at the end of the transition phase, the first activation function is always or mostly selected.

According to an example embodiment, a scheduler adapts the tuning factor in the transition phase such that the first activation function is increasingly overweighted within the transition phase. Thereby, in the transition phase, the activation function is increasingly tuned towards the first activation function in an automated way in order to obtain a neural network at the end of the training which is adapted to solely use the first activation function.

According to an example embodiment, the probability for selecting the second activation function is 1 or essentially 1 at the beginning of the transition phase and the probability for selecting the second activation function is lowered towards 0 or essentially 0 at the end of the transition phase. Thereby, a smooth transition from sole usage of the second activation function to sole usage of the first activation function is achieved.

According to an example embodiment, the probability for selecting the first or second activation function, respectively the tuning factor, based on which the probability is influenced, is changed linearly or nonlinearly in the transition phase. Depending on the respective neural network to be trained linear or nonlinear change of probability may result in a better performance of the neural network. Therefore, linear or nonlinear change of probability can be chosen depending on the neural network and depending on the task to be performed by the neural network.

According to an example embodiment, the random selection is performed based on a random number generator and a scheduler which provides a changeable decision threshold. The random number generator may provide random values in the range between 0 and 1 and the changeable decision threshold may define the threshold at which value between 0 and 1 the first or second activation function should be selected. As such, the changeable decision threshold may form the tuning factor.

According to an example embodiment, the neural network comprises multiple layers and the combination of first activation function and the at least one second activation function is applied to each layer of the neural network.

According to an example embodiment, the combination of activation functions implemented as a random selection of the first activation function or the at least one second activation function is performed for each layer independently from the other layers. So, in other words, the selection of a certain activation function in a certain training step in a first layer may have no influence on the selection of the activation function in the same training step in a second layer of the neural network.

According to an example embodiment, the first activation function is RELU activation function which is described by the following formula:

$$y(x)=\max(0,x).$$

Alternatively, the first activation function may be a variant of RELU activation function, for example a RELU activation function with a certain quantization (e.g. RELU6, RELU8 etc.) or leaky/parametric RELU activation function.

According to an example embodiment, the second activation function is selected out of the list of the following activation functions: Swish, Mish, GELU, ELU. Based on the activation functions, better training results may be obtained.

According to an example embodiment, a training environment used for training the neural network includes a computational hardware different to a production hardware used in a production phase. For training the neural network, a training environment may be used which provides hardware support for more activation functions than the production hardware, specifically embedded hardware used in automotive applications. The extended capabilities of the training environment may be used for determining improved weighting factors of the neural network by using state-of-the-art activation functions.

According to an example embodiment, the training environment includes hardware support for Swish, Mish, GELU and/or ELU activation function and the production hardware includes hardware support for RELU activation function but not for Swish, Mish, GELU and/or ELU activation function. Thereby, it is possible to use Swish, Mish, GELU and/or ELU activation function at the beginning of the training and use a combined activation function which is gradually adapted towards RELU activation function in order to determine a trained neural network with a higher efficiency than training the neural network solely based on RELU activation function.

According to a further aspect, the example embodiments of the present disclosure relate to a computer program for training an artificial neural network. The computer program includes instructions which, when the program is executed by a computer, cause the computer to carry out the steps of:

receiving information regarding a neural network to be trained, after training the neural network to be operated based on a first activation function;

executing an initial training of the neural network based on at least one second activation function, the at least one second activation function being different from the first activation function;

in a transition phase, executing further training steps in which the neural network is trained using a combination of first activation function and the at least one second activation function, wherein the combination of training functions is changed over time such that an overweighting of second activation function at the beginning of the transition phase changes towards an overweighting of first activation function at the end of the transition phase; and executing a final training step based on the first activation function.

The term "vehicle" as used in the present disclosure may refer to a car, truck, bus, train or any other crafts.

The term "essentially" or "approximately" as used in the invention means deviations from the exact value by +/−10%, preferably by +/−5% and/or deviations in the form of changes that are insignificant for the function and/or for the traffic laws.

BRIEF DESCRIPTION OF DRAWINGS

The various aspects of the invention, including its particular features and advantages, will be readily understood from the following detailed description and the accompanying drawings, in which:

FIG. 5 shows a schematic block diagram illustrating the steps of a method for training a neural network based on first and second activation function.

DETAILED DESCRIPTION

Figure 1:
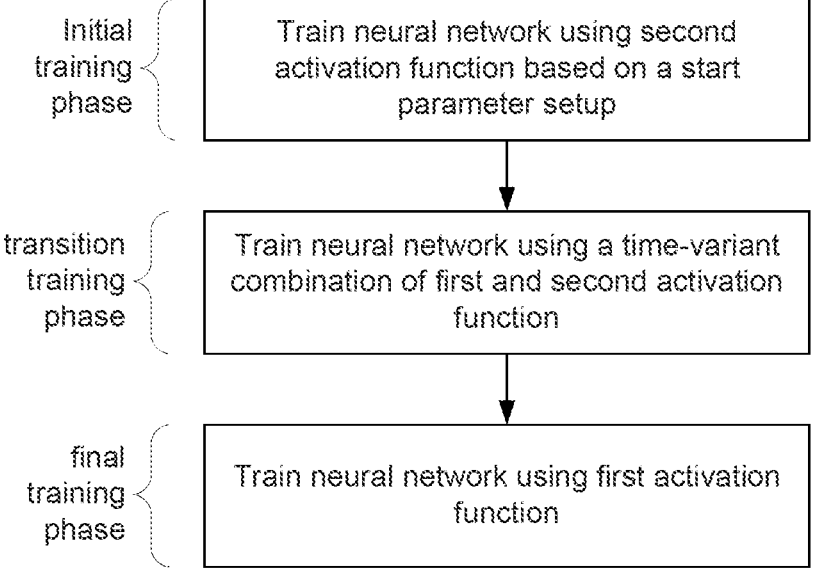
FIG. 1 shows a schematic diagram of a training strategy for training a neural network.

The present invention will now be described more fully with reference to the accompanying drawings, in which example embodiments are shown. The embodiments in the figures may relate to preferred embodiments, while all elements and features described in connection with embodiments may be used, as far as appropriate, in combination with any other embodiment and feature as discussed herein, in particular related to any other embodiment discussed further above. However, this invention should not be construed as limited to the embodiments set forth herein. Throughout the following description similar reference numerals have been used to denote similar elements, parts, items or features, when applicable.

The features disclosed in the specification, the claims, examples and/or the figures may both separately and in any combination thereof be material for realizing the invention in various forms thereof.

FIG. 1 shows a block diagram illustrating the basic training procedure for providing an improved training of a neural network which has to be operated on a target hardware in a production phase which provides no hardware support for state-of-the-art activation functions like Swish, Mish, GELU, ELU.

It is worth mentioning that the computational hardware used for training the neural network is different from the computational hardware on which the neural network is executed during the production phase, in the following referred to as target hardware. As such, the situation occurs that the computational hardware used for training the neural network includes hardware support for multiple different activation functions like Swish, Mish, GELU, ELU and/or RELU, whereas the target hardware includes only a limited hardware support for a certain activation function, e.g., RELU activation function. The target hardware is, for example, an embedded computational system for automotive applications.

As shown in FIG. 1, the training is split in multiple training phases, namely an initial training phase, a transition phase and a final training phase. The goal of such split training is to use at the beginning of the training a second activation function for which in target hardware no hardware support is available, train the neural network based on a time-variant combination of first and second activation functions in the transition phase wherein the time-variant combination is performed such that at the beginning of the training phase, the training is mainly or totally performed based on the second activation function and during the transition phase, the influence of the second activation function on the training is increasingly reduced and the influence of first activation function on the training is progressively increased. Finally, the neural network is trained based on first activation function for which hardware support is available on the target hardware.

More in detail, in the first training phase, the neural network is trained based on a second activation function. The second activation function is different to the first activation function for which hardware support exists on the target hardware. In order to improve the training of the neural network but enable the execution of the neural network on a target hardware which does not provide any hardware support for the second activation function, in the transition phase, an increasing usage of first activation function and a decreased usage of second training function is implemented. So, in other words, the activation function used during training in the transition phase is progressively shifted from the second to the first activation function. Thereby, in the final training phase, the neural network may be trained based on first activation function in order to obtain an improved trained neural network which may be run on a target hardware which provides a hardware support for the first activation function but not for the second activation function.

The time-variant combination of first and at least one second activation function may be realized in different ways.

In a first example embodiment, a linear combination of first and at least one second activation function is performed. In the transition phase, an overall activation function may be used which includes a linear combination of first and at least one second activation functions. The weighting of the first activation function and the at least one second activation function in the overall activation function may be changed based on a tuning factor. By adapting the tuning factor during the transition phase, the weighting of the first and the at least one second activation function may be changed from an overweighting of the at least one second activation function at the beginning of the transition phase towards an overweighting of the first activation function at the end of the transition phase. In the embodiment, at the beginning of the transition phase, the combination of the first activation function and the at least one second activation function is chosen such that the overall activation function is equal or essentially equal to the second activation function, and at the end of the transition phase, the combination of the first activation function and the at least one second activation function is chosen such that the overall activation function is equal or essentially equal to the first activation function.

It is worth mentioning that the linear combination of first and at least one second activation functions may be applied in all layers of the neural network. The tuning factor of the activation functions in all layers may all have the same value and may be tuned simultaneously.

In a second example embodiment, the combination of the first activation function and the at least one second activation function in the transition phase is performed by randomly selecting the first and second activation functions. The random selection may be influenced by a tuning factor which affects the probability for selecting the first activation function or the at least one second activation function. By adapting the tuning factor during the transition phase, the probability of selecting the first activation function or the at least one second activation function may be changed from an overweighting of selecting the at least one second activation function at the beginning of the transition phase towards an overweighting of selecting the first activation function at the end of the transition phase. In the embodiment, at the beginning of the transition phase, the random selection of the first and the at least one second activation function is chosen such that the probability for selecting the second activation function is 1 or essentially 1, and at the end of the transition phase, the random selection of the first and the at least one second activation function is chosen such that the probability for selecting the at least one second activation function is 0 or essentially 0, i.e., at the end of the transition phase, mostly the first activation function is selected.

Figure 2:
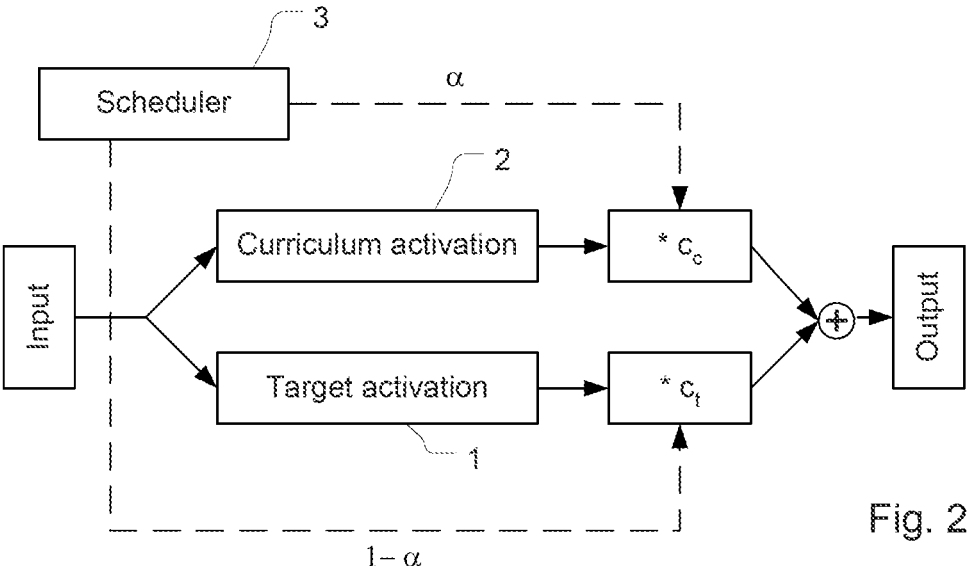
FIG. 2 schematically illustrates an example training environment for training the neural network which implements a linear combination of multiple activation functions.

FIG. 2 shows a schematic block diagram of a training environment for training the neural network. The training environment implements a time-variant linear combination of first and at least one second activation functions 1, 2. Due to the time-variant linear combination, the overall activation function obtained by the linear combination may be dynamically adjusted in order to achieve dynamic activation.

FIG. 2 illustrates the treatment of input information of a single layer of neural network based on a combination of first and second activation functions 1, 2. However, all layers of neural network include similar activation functions.

The overall transfer function is built by a linear combination of a target activation function which may be the first activation function 1 and curriculum activation function. The curriculum activation function may be implemented by one or more second activation functions 2.

The output of the target activation function is multiplied by a coefficient $c_t$, the output of the curriculum activation function is multiplied by a coefficient $c_c$. The results of the multiplications are summed and provided as an output.

The training environment includes a scheduler 3 which provides a tuning factor $\alpha$, which may be a value in the range between 0 and 1. The coefficient $c_c$ may be equal to a and the coefficient $c_t$ may be equal to (1-$\alpha$). During transition phase, the scheduler 3 modifies the value of tuning factor $\alpha$ such that at the beginning of transition phase, the curriculum activation function is overweighted and at the end of transition phase, the target activation function is overweighted.

The overall activation function may be defined by the following formula:

$$f_{act,overall}=c_t \cdot f_{act,1}+c_c \cdot f_{act,2}$$

wherein:

$c_t$: coefficient for target activation function;

$c_c$: coefficient for curriculum activation function;

$f_{act,1}$: first activation function (target activation function); and $f_{act,2}$: second activation function (curriculum activation function).

More in detail, the scheduler 3 may provide a tuning factor $\alpha=1$ at the beginning of the transition phase and the tuning factor $\alpha$ may be decreased to $\alpha=0$ at the end of the transition phase.

According to an example embodiment, the scheduler 3 may change the tuning factor $\alpha$ linearly. According to another example embodiment, the scheduler 3 may change the tuning factor $\alpha$ nonlinearly.

According to an embodiment, during the transition phase, a gradient descent-based training may be performed. When using a gradient descent-based training, the proposed method might face the problem of conflicting gradients. This is due to the use of multiple activations in parallel at the same layer, and their gradients might differ. Note that this phenomenon depends on the derivative of the curriculum and target activation functions, and if it is present then the conflicts may be optionally resolved by using techniques from the field of multi-task learning, for example Yu et al. "Gradient Surgery for Multi-Task Learning" 2020, or Chen et al. "Just Pick a Sign: Optimizing Deep Multitask Models with Gradient Sign Dropout" 2020.

Figure 3:
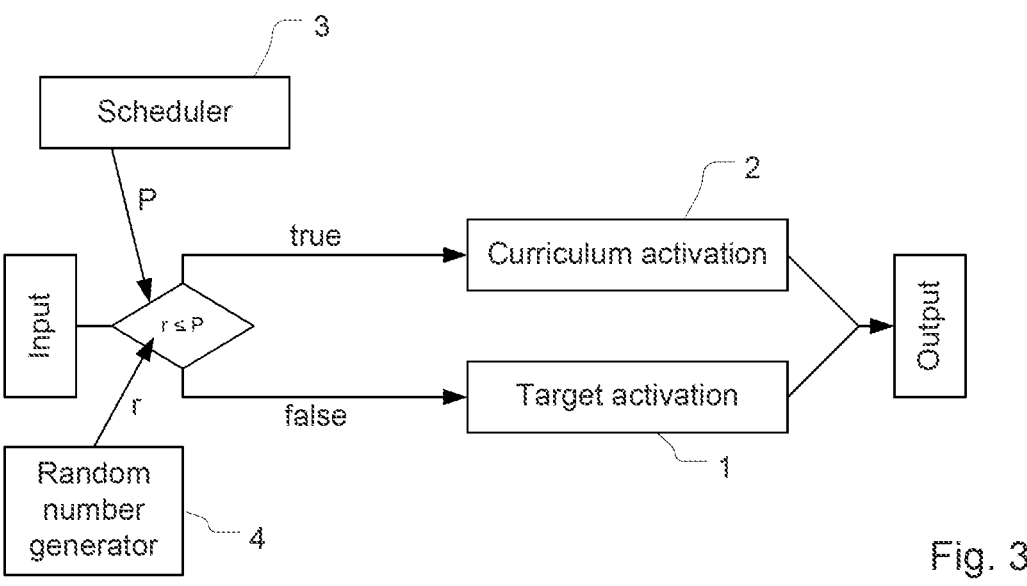
FIG. 3 schematically illustrates a further embodiment of a training environment for training a neural network which implements a combination of multiple activation functions by randomly selecting different activation functions.
Figure 4:
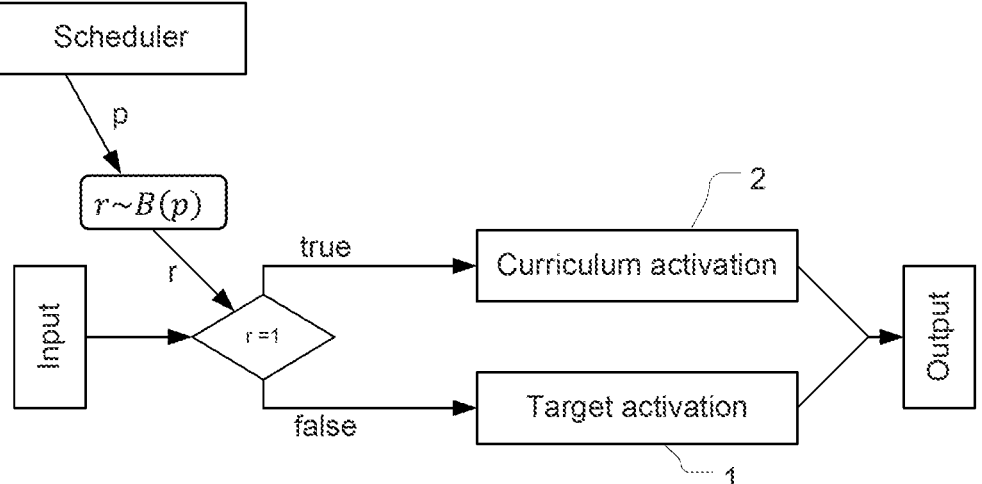
FIG. 4 schematically illustrates yet another embodiment of a training environment for training a neural network which implements a combination of multiple activation functions by randomly selecting different activation functions.

FIGS. 3 and 4 illustrate a schematic block diagrams of training environments for training the neural network which implement a time-variant combination of first and at least one second activation function 1, 2 by randomly selecting first or second activation function 1, 2 as the current activation function.

A scheduler 3 is used for influencing the probability of selecting the first or the second activation function 1, 2 as the current activation function. The scheduler 3 provides an output that affects the probability of selecting the first or the second activation function 1, 2 as the current activation function. During the transition phase, the output of the scheduler 3 is changed such that at the beginning of the transition phase the selection of the curriculum activation function is overweighted, the probability of selecting the curriculum activation function (second activation function 2) is 1. During the transition phase, the probability of selecting the curriculum activation function is reduced and approaches 0, i.e., at the end of the transition phase, the probability of selecting the target activation function (first activation function 1) is 1.

According to the embodiment of FIG. 3, the output of the scheduler 3 is a decision threshold P. A random number generator 3 provides a random number r in the range between 0 and 1.

Depending on the random number r and value of decision threshold P, the selection of first or second activation function 1, 2 may be obtained by the following formula:

$$r \leq P;$$

wherein the first activation function 1 is selected when the result of the inequation is false and the second activation function 2 is selected when the result of the inequation is true.

The scheduler 3 may adopt the decision threshold P from P=1 at the beginning of the transition phase to P=0 at the end of the transition phase in order to implement an increasing influence of the first activation function 1 towards the end of the transition phase.

According to the embodiment of FIG. 4, the random selection which is influenced by the scheduler 3 is solved by using a Bernoulli distribution B(P) which is influenced by the decision threshold P provided by the scheduler 3. So, like in case of coin flipping the output r of Bernoulli distribution B(P) is either 0 or 1, wherein the probability of obtaining 0 or 1 can be changed. As a result, at the beginning of the transition phase, the probability of r being 1 is maximum, specifically 1 and is reduced to zero at the end of the transition phase.

According to an example embodiment, the scheduler 3 may change the decision threshold P linearly. According to another example embodiment, the scheduler 3 may change the decision threshold P nonlinearly.

It is worth mentioning that the neural network may include multiple layers and the proposed random selection of the first activation function and the second activation function 1, 2 may be performed separately at each layer and independently from the other layers.

The first activation function 1 might be a RELU activation function (RELU: Rectified Linear Unit) which is defined by the following formula:

$$y(x)=\max(0,x) \qquad \text{(Formula 1)}$$

RELU activation function is widely supported by common embedded hardware, specifically embedded hardware for automotive applications.

Regarding the RELU activation function, reference is made to the following document: Nair and Hinton, Rectified Linear Units Improve Restricted Boltzmann Machines, ICML 2010.

In the following, possible example implementations of the second activation functions 2 are provided. For example, the second activation function 2 might be one of the following activation functions:

Swish (Ramachandran et al. Searching for Activation Functions, ICLR 2018);

Mish (Misra, Mish: A Self Regularized Non-Monotonic Activation Function, BMVC 2020);

GELU (GELU: Gaussian Error Linear Unit) (Hendrycks et al. Gaussian Error Linear Units (GELUs), 2016);

ELU (ELU: Error Linear Unit) (Clevert et al. Fast and Accurate Deep Network Learning by Exponential Linear Units (ELUs), ICLR 2016).

FIG. 5 shows a flow diagram illustrating the steps of a method for training an artificial neural network.

First, a neural network to be trained is provided which should be operated based on a first activation function on target hardware after the training process (510).

Subsequently, an initial training of the neural network is executed based on a second activation function (S11). The second activation function is different from the first activation function.

After execution of initial training, further training of the neural network is performed in a transition phase. In the transition phase, further training steps are executed, in which the neural network is trained using a combination of the first activation function and at least one second activation function, wherein the combination of training functions is changed over time such that an overweighting of the at least one second activation function at the beginning of the transition phase changes towards an overweighting of the first activation function at the end of the transition phase (S12).

Finally, a final training step is executed based on the first activation function (S13).

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS

1 first activation function
2 second activation function
3 scheduler
α tuning factor
P decision threshold

The invention claimed is:

1. A method for training an artificial neural network, the method comprising:

providing a neural network to be trained, wherein after training the neural network to be operated based on a first activation function;

executing an initial training of the neural network based on at least one second activation function, the at least one second activation function being different from the first activation function;

executing further training steps in a transition phase in which the neural network is trained using a combination of the first activation function and the at least one second activation function, wherein the combination of training functions is changed over time by a tuning factor, wherein a scheduler adapts the tuning factor such that the first activation function is overweighted increasingly within the transition phase, so that the transition phase includes at least a beginning transition step in which a weight of the at least one second activation function in the combination is greater than a weight of the first activation function and at least an ending transition step in which a weight of the first activation function in the combination is greater than a weight of the at least one second activation function; and executing a final training step based on the first activation function, the final training step being the last step of training the neural network before the neural network is operated based on the first activation function.

2. The method according to claim 1, wherein the combination is a linear combination of the first activation function and the at least one second activation function.

3. The method according to claim 2, wherein an overall activation function providing a linear combination of the first activation function and the second activation function is built according to the equation:

$$f_{act,overall}=\alpha \cdot f_{act,1}+(1-\alpha) \cdot f_{act,2}$$

wherein:
a is the tuning factor, wherein a∈[0,1];
$f_{act,1}$ is the first activation function; and
$f_{act,2}$ is the second activation function.

4. The method according to claim 1, wherein the tuning factor is changed linearly or nonlinearly in the transition phase.

5. The method according to claim 1, wherein the combination is a random selection of the first activation function or the at least one second activation function.

6. The method according to claim 5, wherein a probability for randomly selecting the first activation function or the at least one second activation function is changeable by means of the tuning factor.

7. The method according to claim 6, wherein the probability for randomly selecting the first activation function or the at least one second activation function is 1 or essentially 1 in selecting the at least one second activation function at a beginning of the transition phase and is lowered towards 0 at an end of the transition phase.

8. The method according to claim 6, wherein the tuning factor is changed linearly or nonlinearly in the transition phase.

9. The method according to claim 5, wherein random selection is performed based on a random number generator and a scheduler which provides a changeable decision threshold.

10. The method according to claim 1, wherein the neural network comprises multiple layers and the combination of the first activation function and the at least one second activation function is applied to each layer of the neural network.

11. The method according to claim 10, wherein the combination of activation functions is implemented as a random selection of the first activation function or the at least one second activation function and is performed for each layer independently from the other layers.

12. The method according to claim 1, wherein the first activation function is a Rectified Linear Unit (RELU) activation function which is described by the following formula:

$$y(x)=\max(0,x)$$

and the at least one second activation function is selected out of the list of the following activation functions: Swish, Mish, gaussian-error linear unit (GELU), exponential linear unit (ELU).

13. A non-transitory computer readable medium comprising instructions which, when executed by a computer, cause the computer to carry out a method for training an artificial neural network comprising:

receiving information regarding a neural network to be trained, wherein after training the neural network is to be operated based on a first activation function;

executing an initial training of the neural network based on at least one second activation function, the at least one second activation function being different from the first activation function;

executing further training steps in a transition phase in which the neural network is trained using a combination of the first activation function and the at least one second activation function, wherein the combination of training functions is changed over time by a tuning factor, wherein a scheduler adapts the tuning factor such that the first activation function is overweighted increasingly within the transition phase, so that the transition phase includes at least a beginning transition step in which a weight of the at least one second activation function in the combination is greater than a weight of the first activation function and at least an ending transition step in which a weight of the first activation function in the combination is greater than a weight of the at least one second activation function; and executing a final training based on the first activation function, the final training step being the last step of training the neural network before the neural network is operated based on the first activation function.

* * * * *